United States Patent [19]

Smith

[11] Patent Number: 5,438,678

[45] Date of Patent: Aug. 1, 1995

[54] SELF-POWERED COMPUTER ACCESSORY DEVICE FOR POWER EXTRACTION FROM ATTACHED DATA SIGNALS AND METHOD OF OPERATING THEREOF

[76] Inventor: Peter L. Smith, 9-11 Enfield Avenue, Park Orchards, Victoria 3114, Australia

[21] Appl. No.: 35,934

[22] Filed: Mar. 23, 1994

[51] Int. Cl.⁶ .......................... G06F 1/32; H02M 7/00
[52] U.S. Cl. .................... 395/750; 364/707; 364/273.2; 364/273.1; 364/DIG. 1; 340/390.01; 363/126
[58] Field of Search .............. 395/750, 325, 200; 364/707; 307/261, 66; 340/310 A; 363/126

[56] References Cited

U.S. PATENT DOCUMENTS

| | | | |
|---|---|---|---|
| 4,621,170 | 11/1986 | Picandet | 370/24 |
| 4,851,715 | 7/1989 | Strong | 307/456 |
| 4,866,602 | 9/1989 | Hall | 345/157 |
| 4,884,287 | 11/1989 | Jones et al. | 375/121 |
| 4,901,217 | 2/1990 | Wilson | 363/126 |
| 5,179,710 | 1/1993 | Coschieri | 395/750 |
| 5,257,289 | 10/1993 | Jopson | 375/36 |

Primary Examiner—Gopal C. Ray
Attorney, Agent, or Firm—Helfgott & Karas

[57] ABSTRACT

A self-powered intelligent computer accessory device has a serial data input port and a parallel data output port and is used for interconnection from computer to computer and between a computer and a peripheral device. The accessory device uses a full wave diode bridge to generate bipolar supply voltages referenced to ground from the serial data port to power a microprocessor of the accessory device. A power extraction circuit is provided on the output side of the microprocessor for extracting power from standard pull-up resistors within the peripheral device to power an output buffer circuit. The period of time in which power is extracted from the pullup resistors is maximized by using an enable control signal from the microprocessor to ensure that the output buffer circuit is only driving the external peripheral device during the output data strobe sequence and at all other times is not consuming power. The buffer circuit is constructed and controlled such that it is capable of driving the load of the external peripheral device but draws virtually no power in performing this task.

4 Claims, 2 Drawing Sheets

SELF-POWERED COMPUTER ACCESSORY DEVICE FOR POWER EXTRACTION FROM ATTACHED DATA SIGNALS AND METHOD OF OPERATING THEREOF

BACKGROUND OF THE INVENTION

The present invention relates to a method for extracting power from attached signals to provide operating power for small intelligent (that is, incorporating a microprocessor) computer accessory devices and to an accessory device incorporating the method. Such devices provide, for example, interconnection between computers and between computers and peripheral devices. Typical peripheral devices include computer data protocol convertors, printer data buffers, modems and printer and computer sharers. Such accessory devices, due to the moderate power levels required to operate the internal electronics are typically powered by an AC mains plug pack or separately packaged AC mains transformer.

The expansion of the use of portable battery powered note book computers and portable battery powered printers to provide complete independence from the AC mains has of course meant that these intelligent computer accessory devices cannot be used with a note book computer and battery printer without close proximity to an AC mains supply to power the accessory.

These separate AC mains transformers or plug packs are also rather cumbersome and are clumsy to install when used in transient locations. Thus the disadvantages are that they are required at all when all other devices are battery powered and that they are inconvenient to use.

A very typical characteristic of these computer accessory devices is that they are sold into a very price sensitive market and so the cost of providing a power source must be absolutely minimized.

Firstly it should be emphasized that the accessory device to which the present invention applies is one that employs a microprocessor to achieve the required functionality. Such a microprocessor could easily draw 100–200 mW. A class of "dumb" signal data powered computer interconnection accessory that requires very little power has existed for some time. These are short haul line drivers that extend the distance over which RS232 signals may be transmitted.

As mentioned above the typical power source for known computer accessories is an external AC mains transformer or plug pack. No extra explanation is felt necessary as this class of power source is well established. Some computer accessories include a provision for replaceable or rechargeable batteries within the body of the accessory. This method is not widely used. The user of such a computer accessory is forced to keep account of yet another set of batteries which may explain why this method has lacked popularity.

Some particular brands of computers and peripherals such as printers provide an auxiliary current limited power source on unused pins within the interconnection sockets. Such a source of power could easily be adapted to power interconnection accessories. The problem with use of such a power source is that computers and peripherals that provide such auxiliary power are not common and the pins of the inter-connection socket used for this power are not standard. Any product developed using such a power source would only have a limited and specific application.

The problem of providing power does not lend itself to a traditional solution such as rectifying the incoming serial data signal and feeding this to a switch mode transformer coupled DC/DC convertor, as such a switch mode power supply will not start up with the relatively high source resistance of the serial data input. Also such a switch mode power supply will be inefficient at these voltages and power levels, expensive, and will be physically large.

SUMMARY OF THE INVENTION

Accordingly it is an object of the present invention to provide a method of extracting power from attached data signals for small intelligent computer accessory devices which avoids or overcomes one or more of the aforementioned problems or difficulties or existing power supply arrangements.

A further object is to provide an improved apparatus in the form of a small intelligent computer accessory device capable of extracting operating power for the device from the attached data signal.

DESCRIPTION OF THE INVENTION

The invention consists of a number of interworking electronic circuit techniques combined with specially developed software within the interconnection device to achieve the aim of powering the computer interconnection accessory totally from the power available in the serial data input port and the parallel data output port at the minimum possible cost.

More specifically, the invention comprises three interrelated circuit techniques to both derive power from the available serial and parallel ports, minimize power consumption and provide logic level translation between functional elements within the computer interconnection accessory.

The invention resides in the application of these three techniques together to meet the objective of powering a computer interconnection accessory device from power available in the data connections of computers and peripherals attached to the accessory device. The techniques presented are described only in relation to a single serial data input port and a single parallel output port. Clearly they can be expanded to realize a computer interconnection accessory with any number of serial data input ports and any number of parallel output ports.

Any realisation for a given set of serial input and parallel output ports and a given function that the computer interconnection accessory must perform, must use these techniques, as well as good detailed design to achieve an operable solution. The realization is of course still bound by the physical constraints such as the total amount of power that may be drained from the total number of serial ports before these ports overload and switch off.

In order that the invention may be more clearly understood a particular embodiment will now be described with reference to the accompanying drawings.

DETAILED DESCRIPTION OF THE PREFERRED EMBODIMENTS

Figure 1:
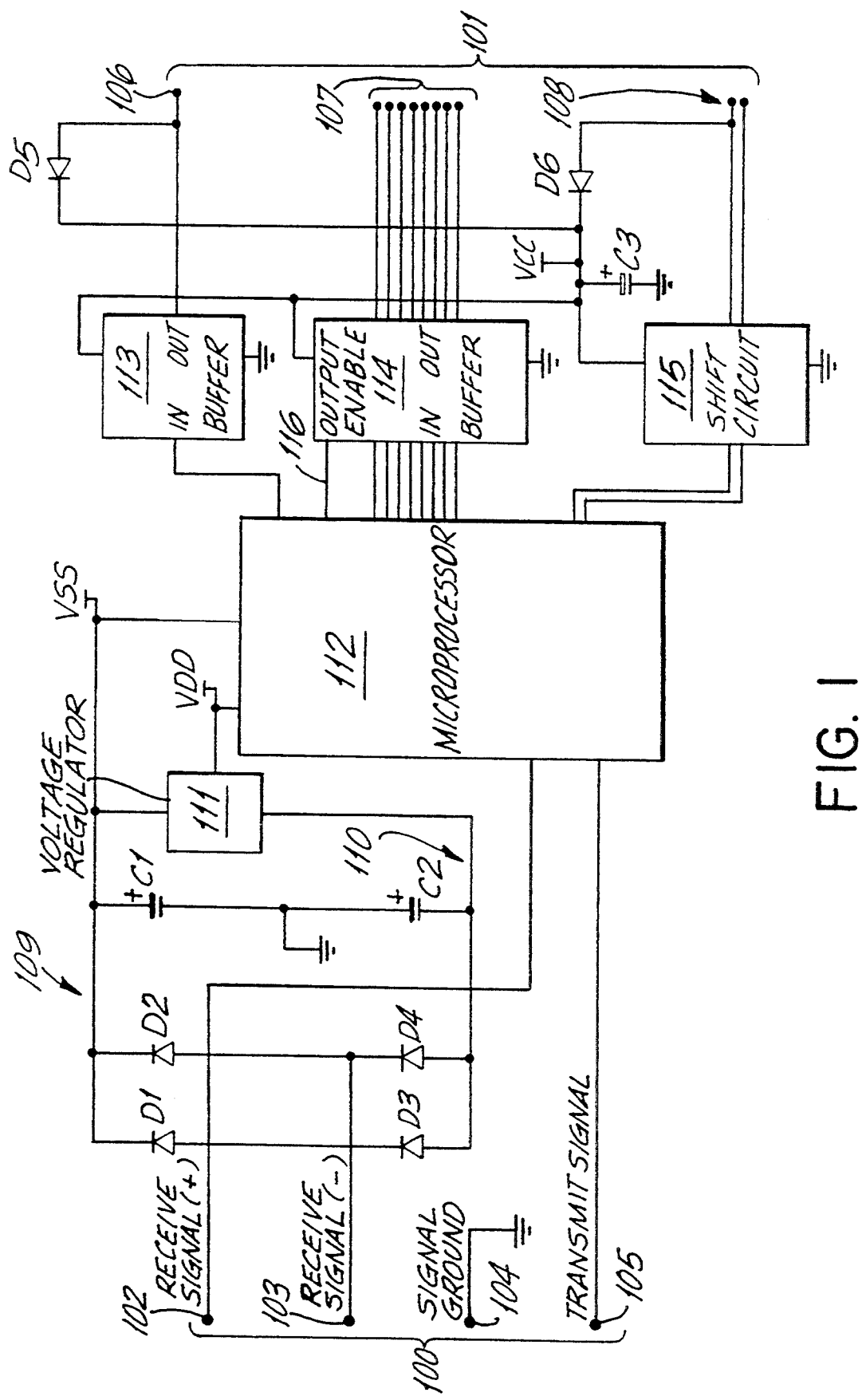
FIG. 1 is a circuit block diagram of a computer accessory device according to the invention.

The device shown in the drawings is, for simplicity and convenience, a version of the invention with a single serial input port 100 and a single parallel output port 101. The number of ports may be added at will by simply layering the circuitry to add more serial or parallel ports. The function of the interconnection device is not important except that data is received on the serial data input port 100, is processed in some way, and is then transmitted to a peripheral device (not shown) attached to the parallel output port 101.

The serial data input port 100 includes four input terminals which comprise receive signal positive supply terminal 102, receive signal negative supply terminal 103, ground terminal 104 and transmit data terminal 105.

The parallel data output port 101 comprises output data strobe connection 106, parallel data output connections 107 and parallel data output handshake connections 108.

The serial data input signals are fed into a full wave bridge circuit D1, D2, D3, D4 with capacitor filters C1, C2. This circuit rectifies the incoming serial data signals to produce a DC supply for some of the internal electronics. The circuit also allows these signals to pass to the internal electronics for reception and data processing. As the serial data signals swing in both a positive and negative direction from ground the resulting rectification produces both positive power supply rail 109 and a negative power supply rail 110.

The rails 109, 110 are the raw DC rails and a voltage regulator circuit 111 is employed to produce power supply rails suitable for use by microprocessor circuitry 112. The voltage regulator circuit 111 produces the positive voltage rail of VSS and the negative rail of VDD. The typical difference between VSS and VDD is 5 Volts. The microprocessor circuitry 112 comprises CMOS microprocessor and serial line interface circuits.

The advantage of this circuit is that the microprocessor circuitry only draws the power it needs to operate and providing that distant serial data transmitters have sufficient drive capability then this circuit will allow data signals to pass as well as extracting DC power.

Another advantage is that, as the microprocessor is powered by a positive voltage relative to ground (VSS) and a negative voltage relative to ground (VDD), then the microprocessor may directly input and output the bipolar voltage levels associated with most serial transmission without the expense and complexity associated with unipolar to bipolar level translation in a more traditional circuit with the microprocessor being supplied by unipolar supply voltages of +5 Volts and ground.

The serial data input signals will typically be a balanced transmission pair common with the RS423 standard. However suitable circuitry could be developed to use this power extraction technique with most other commonly available serial data signal lines.

The source of power from the parallel output port 101 is standard pullup resistors to +5 Volts within the peripheral equipment parallel input ports to which the computer interconnection accessory is connected and configured to send data. The value of these resistors (not shown) is in the range of 1,000 ohms to 4700 ohms for all data and handshake lines although most peripheral equipment uses the latter value so that any power extraction technique must be capable of working with pullup values of 4700 ohms. Clearly with a value of 4700 ohms very little power can be extracted without severely dropping the voltage.

The technique employed is to:
i) Use the extracted power only to supply the parallel output circuitry alone and ensure that power is extracted from all available signal lines of the parallel port.
ii) Maximize the time that the pullup resistors in the external peripheral equipment are able to supply power to the parallel output circuits by software techniques.
iii) Construct output drive circuitry such that this circuitry is capable of driving a low load impedance but draws virtually no power in performing this output line driving.

Each of these three techniques is discussed hereinafter.

Firstly, the circuitry of the computer interconnection accessory is segregated such that the power extracted from the peripheral connected to the parallel port is only used to power by way of VCC power supply rail the circuitry associated with actually driving output data on the parallel port 101. This is achieved by good detail design practices as well as level shifting between the microprocessor circuitry 112 and parallel output drive circuitry in the form of CMOS parallel output buffers 113 and 114, and level shift device 115 to provide this segregation. The VCC rail is unipolar and positive above ground. The reason for this partition is to absolutely minimize the power required by the parallel port circuitry and correspondingly minimize the power that needs to be extracted from the peripheral device connected to the parallel output port 101.

The means of extracting the power from the parallel port of the external peripheral device will be understood by realizing that the external peripheral device appears as a number of pullup resistors connected to typically the +5 volt rail in the external peripheral device. In the case of a Centronics port the number of pullup resistors is up to twelve corresponding to twelve signal connections on the interconnection socket.

The VCC power supply rail is charged by diodes D5, D6, external to buffers 113 and 114 and the device 115 as well as internal protection diodes (not shown) within the devices 113, 114 and 115 connected to the parallel port and also by any pullup resistors within the computer interconnection accessory that are connected between the parallel data output connections 107 and the VCC rail.

In this way a number of circuits are acting in unison to supply charge to the VCC rail and C3 and so provide a stable power source for the output devices 113, 114 and 115. Any detailed design must of course take into account the senses of all signals of the parallel port 101 and apply diodes and internal pullup resistors as required.

Next is to maximize the time that the pullup resistors (not shown) are able to supply power. The usage of power must be minimized by careful design as discussed above but also the collection period of this power should also be maximized. This is achieved by using an output enable control 116 from the microprocessor 112 to the data output buffer 114 so that the buffer is only enabled and driving to the external peripheral device during the output data strobe sequence. At all other times this output buffer 114 is disabled so that power is not consumed and the internal protection diodes and pullup resistors on data output connections 107 are able to charge C3 and maintain the voltage VCC at a sufficient and stable voltage.

Even with the techniques of i) and ii) above the power available from the external peripheral device is very low (possibly only 5 mW for a Centronics port) so the most important aspect of the parallel port output circuit is to be able to use this meager power and still drive the relatively low value pullup resistors in the attached peripheral equipment. An aspect of this minimization of power usage is achieved by the techniques of iii) above by only enabling the output buffer 114 for a minimum time. This involves enabling the output buffer only as required so as to maximize the "collected" power from the output port which facilitates use of the minute power (5 mW) to drive a moderate load. The dominant means of achieving this requirement iii) is achieved in the topology of the output circuit itself. In other words the key to the operation of the parallel output circuit is not so much the power collection method but rather the circuit techniques used to drive the external device, that is, the technique by which almost zero power is used to drive an external device such as a printer. The technique will be evident from a discussion of the circuit.

The parallel output drivers (buffers 113, 114) must drive into the load presented by the attached peripheral. The load for each signal line may be modelled as a pullup resistor to typically +5 Volts within the attached peripheral. The value of this resistor is usually in the range 1000 ohms to 4700 ohms.

A model for a low current consuming drive circuit capable of driving such a load is an output device that has a switch to connect the output pin to 0 volts to drive a logic low and a switch to connect the output pin to VCC to drive a logic high. Such an output device would draw no current when driving low as the circuit is made from the external load to the 0 volt or ground rail and no charge is discharged from C3.

When this desired output device drives logic high no current is actually drawn by the load as the pullup resistor is simply taken to its rest or zero current state and consequently no charge is drawn from C3. The model for the desired low current drive circuit could possibly delete the switch to VCC and simply let the external load pullup resistors set a logic high state but the slew rate is faster if such a logic high switch is employed and the output impedance is greatly reduced and hence the noise and cross-talk immunity is considerably increased if an output device with such a switch to VCC is used.

Thus the use of an output drive with these characteristics will draw little current from the VCC supply rail and still be capable of driving the load of the external peripheral device. Such an output device will of course consume some current during the switching transitions and is discussed in relation to a practical embodiment hereinbelow.

There is described above the derivation of the positive to ground power supply rail of VSS and the negative to ground power supply rail of VDD from the serial data input port 100 to power the microprocessor circuitry 112. Also described is the derivation of the positive to ground power supply rail of VCC to power the parallel data output port 101. Traditionally the coupling of logic signals between two logic circuits having bipolar and unipolar logic levels has called for complicated and expensive level translation circuitry.

However by choosing logic devices with biased input switching levels and by controlling VSS this level translation can be made simply and directly. This is achieved by choosing the input switching characteristics of the output devices 113 and 114 such that a voltage swing of 0 volts to VSS will be seen by the output devices as a change of state. It should be remembered that VSS-VDD and VCC will be typically 5 volts.

Figure 2:
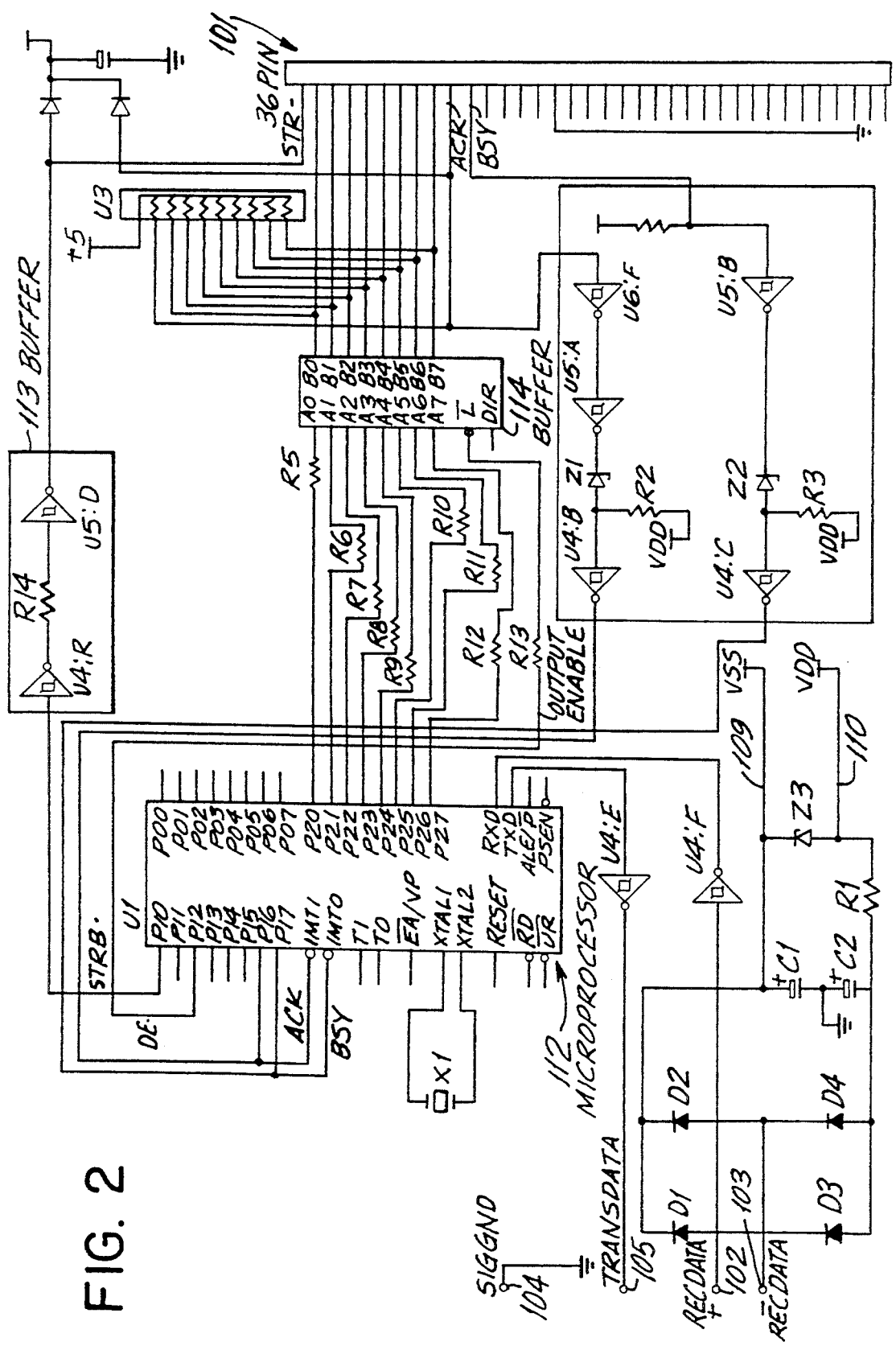
FIG. 2 is a simplified schematic circuit diagram of the device shown in FIG. 1.

The simplified schematic drawing of FIG. 2 is a embodiment of the invention to realize a typical computer interconnection accessory device. There is shown a serial to parallel convertor with one serial data input port and one parallel Centronics output port. This circuit schematic does omit some operational circuitry for clarity and the omitted circuitry is deemed not necessary for a full understanding of the invention. In FIG. 2 the components generally have the same reference numerals as those shown in FIG. 1.

The serial port power extraction circuitry is almost identical to that described in the above discussion relating to FIG. 1. In this case the power is extracted from a balanced data line conforming approximately to the RS423 specification in that the signal swings approximately $+/-5$ volts into an open circuit and approximately $+/-2.5$ volts into a 100 ohm load.

This balanced signal (RECDATA+ and RECDATA−) is passed to the full wave bridge rectifier and filter capacitors (D1, D2, D3, D4, C1, C2) to produce a DC voltage to pass to the voltage regulator. The voltage regulator 111 of FIG. 1 is realized by the resistor R1 and the zener diode Z3. This voltage regulator is arranged to produce the highest possible positive VSS voltage and to regulate the negative VDD voltage. This circuit provides a VSS voltage of approximately 3.0 volts and a VDD voltage of −2.5 volts. This of course provides a VSS-VDD voltage of 5.5 volts to power the microprocessor 112 and serial interface devices.

The signal RECDATA+ is passed to the serial data receiver device U4:F before connection to the microprocessor 112. Similarly the signal TRANSDATA is driven by U4:E after connection from the microprocessor. The signal TRANSDATA is used to carry flow control signals to the distant serial transmission computer (not shown).

The devices U4:F and U4:E are conventional 74HC CMOS devices and are able to receive and transmit the bipolar serial data signals only because they are powered by the bipolar signals of VSS and VDD as well as the microprocessor 112.

The microprocessor 112 is a conventional Intel CMOS 80C51 device. This device draws approximately 10–15 mA of current from the supply rails of VSS and VDD. The function performed by the software within the microprocessor in this embodiment is serial data input/parallel data output conversion with data buffering and flow control.

The parallel output buffer 114 is realized by a 74HCT245 device and the output buffer 113, which is a strobe device, is realized by 74HCT14 devices. Such devices meet the specified requirements mentioned in iii) above and are able to switch the output when driving the external pullup load to either a high state or a low state and consume virtually no power in the steady state condition. The devices do of course draw a little power during switching transitions.

The parallel port power extraction circuitry consists of the diodes D5, D6, the resistor pack U3 and the internal protection diodes (not shown) within buffer 114 and U5:B, strobe device 113 and U5:F. Each of these devices may contribute charge to C3 depending on the voltage on C3 and the parallel port connection pins themselves. The voltage on C3 (+5) is the supply voltage above ground for buffer 114 and U5.

The above devices realize a virtually zero power Centronics output circuit. These devices are of course pinned out to a standard 36 pin Centronics connector.

The output data buffer 114 has a enable/disable control exercised by the microprocessor. This control is such that the output is enabled only during the time that the data output strobe (STR*) is enabled or asserted. In this way the external peripheral device is used such that the power is available from that device for the maximum time and that the parallel output circuitry is driven or enabled for the least time possible.

The technique has been discussed above whereby direct level translation is possible by careful circuit design where logic levels require translation between two elements of circuitry and one element is powered by bipolar supply rails (VSS and VDD) and the other element is powered by a unipolar supply rail (+5). This is achieved by maximizing the positive voltage VSS (in this case 3.0 volts) and by using level translation circuitry which involves devices with a low switching threshold of nominally 1.5 volts. Such devices are the 74HCT series of CMOS logic. Thus a direct connection of the two sides of the device is possible without complicated level translation circuitry even though the logic swing is only 3 volts. This technique is used to interconnect the eight data bus lines, the data strobe (STR*) and the output data buffer enable control. The 10,000 ohm resistors (R5 through R14) form part of the level translation circuitry and limit current when the input signal swings towards the negative rail of VDD. For handshake signals that must be inputted to the microprocessor from the parallel port a more traditional form of level shifting is employed using resistors and zener diodes (R2, R3, Z1, Z2).

This circuit 115 uses the devices U4:B, U4:C, U5:A, U5:F, U5:B, R2, R3, Z1 and Z2 to perform the function of level shifting between the parallel port signals 101 and the microprocessor circuitry 112. The devices U5:A, U5:F, U5:B which are powered from the +5 rail provide hysteris on the signals ACK* and BSY to be inputted from the remote parallel port device. The zener diodes Z1, Z2 drop the voltage such that the inputs to U4:B and U4:C powered from VSS and VDD swing across their respective transition input voltages such that logic states change on the outputs of U4:B and U4:C which are in turn connected to the microprocessor circuit 112. In this way the signals ACK* and BSY are coupled to the microprocessor circuit 112.

I claim:

1. A self-powered computer accessory device for extracting operating power from attached signals, the device comprising:
   a serial data input port;
   a parallel data output port;
   a microprocessor for processing data passing between said input port and said output port;
   a diode circuit between said data input port and said microprocessor for generating bipolar voltages from serial data received at said input data port and providing operating power to said microprocessor;
   a parallel output buffer circuit coupled between said microprocessor and said data output port;
   a power extraction circuit connected to signal lines of said data output port for deriving unipolar voltages from a peripheral device connected to said data output port,
   said unipolar voltages having different voltage levels from said bipolar voltages and providing power for driving said output buffer circuit; and
   a level translation circuit between said microprocessor and said buffer circuit and including, for each of said signal lines, a driver provided in said microprocessor, a receiver provided within said output buffer circuit and a resistor between each driver and each corresponding receiver, wherein each receiver has a low switching threshold which is sufficiently below maximum levels of said bipolar voltages so that said level translation circuit facilitates reliable data transfer from said input port to said output port despite said different voltage levels.

2. An accessory device as defined in claim 1, wherein said power extraction circuit comprises resistors and diodes connected to said signal lines, respectively, and a capacitor for receiving charge from said resistors and diodes depending on a voltage on said capacitor and a voltage on a respective signal line.

3. An accessory device as defined in claim 1, further comprising means for providing a control signal from said microprocessor to said buffer circuit for maximizing the time during which said power is derived from the peripheral device to control said buffer circuit so as to enable said buffer circuit only to drive said peripheral device during an output data strobe sequence and disable said output buffer circuit to thereby prevent said output buffer circuit from consuming power at all other times.

4. A method for extracting operating power from attached signals in a self-powered computer accessory device including a serial data input port, a parallel data output port, a microprocessor between said input port and said output port, and an output buffer circuit, the method comprising the steps of full wave rectifying an incoming data signal input to said input port to generate positive and negative supply voltages to power said microprocessor; deriving supply voltages positive in respect to ground only from a peripheral device connected to said output port to drive said buffer circuit by said supply voltages; directly coupling data signals from said microprocessor to said output buffer circuit; providing in said device a power extract circuit and a level translation circuit each coupled to said buffer circuit; and controlling said output buffer circuit by said power extraction circuit and said level translation circuit so that virtually no power is consumed in driving data to the peripheral device.

* * * * *

UNITED STATES PATENT AND TRADEMARK OFFICE
CERTIFICATE OF CORRECTION

PATENT NO. : 5,438,678
DATED : AUGUST 1, 1995
INVENTOR(S) : Peter Leslie SMITH

It is certified that error appears in the above-identified patent and that said Letters Patent is hereby corrected as shown below:

On the title page, item [22] should read as follows:

-- Mar. 23, 1993 --.

Signed and Sealed this

Seventeenth Day of October, 1995

Attest:

BRUCE LEHMAN

Attesting Officer     *Commissioner of Patents and Trademarks*